UNITED STATES PATENT OFFICE 1,970,246

MANUFACTURE OF NEW DYESTUFFS AND THE APPLICATION THEREOF

Henry Charles Olpin, Spondon, near Derby, England, assignor to Celanese Corporation of America, a corporation of Delaware No Drawing. Application January 25, 1930, Serial No. 423,547. In Great Britain March 12, 1929

8 Claims. (Cl. 8—5)

This invention relates to the manufacture of new azo dyestuffs and the application thereof and more particularly their application to materials made of or containing cellulose acetate or other cellulose esters or ethers.

The new azo dyestuffs of the present invention are characterized in that they contain the tetra-hydronaphthalene nucleus and are derived from ar-tetra-hydro-α- or β-naphthylamine or derivatives thereof. They may be prepared either by diazotizing an ar-tetra-hydro-α- or β-naphthylamine and coupling with a suitable component or by coupling any suitable diazo compound with ar-tetra-hydro-α- or β-naphthylamine or a derivative thereof.

Dyestuffs prepared by using an ar-tetra-hydro-α- or β-naphthylamine or other amino compound as coupling component may be diazotized and coupled either in substance or on the fibre, while those containing groups capable of effecting a coupling may be coupled either in substance or on the fibre with diazo bodies.

The new dyestuffs of the present invention and more particularly the unsulphonated dyestuffs are especially of value for dyeing or otherwise colouring materials made of cellulose acetate or other cellulose esters or ethers, for example cellulose formate, propionate or butyrate or the products obtained by the treatment of alkalized cellulose with esterifying agents, e. g. the product known as "immunized cotton" obtained with p-toluene sulpho-chloride, or methyl, ethyl or benzyl cellulose or the like, or materials containing cellulose esters or ethers mixed with other fibers. In certain cases mono sulphonated dyestuffs may also be employed.

Dyestuffs prepared by using ar-tetra-hydro-α-naphthylamine or a derivative thereof as end component give fuller shades than those obtained by using the β-compound or a derivative thereof as end component.

Though the parent amines or amino derivatives are more closely allied to the corresponding compounds of the benzene series than to those of the naphthalene series, the new dyestuffs are found to be much superior to the corresponding benzenoid dyestuffs which are in general pronouncedly phototropic.

In addition to being applicable in substance, the new dyestuffs may be formed on the materials themselves, for example by applying both base and developer together and subsequently diazotizing, by applying the base, diazotizing on the fibre and coupling, or by applying the coupler and developing with a diazo solution.

The following are some examples of dyestuffs which may be prepared and applied according to the present invention, which is however not to be considered as limited thereto.

| Component | Diazotized and coupled with— | Probable structural formula | Shade |
|---|---|---|---|
| Ar-tetrahydro-β-naphthylamine. | Phenol | 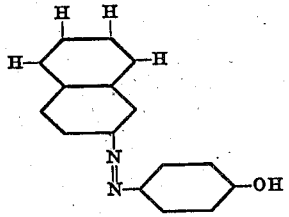 | Yellow. |
| Ar-tetrahydro-β-naphthylamine. | Naphthol AS.BS | 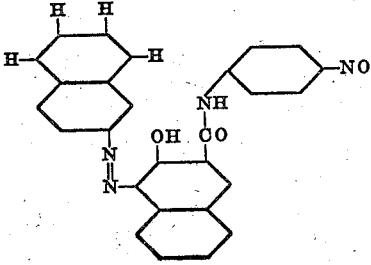 | Orange. |

| Component | Diazotized and coupled with— | Probable structural formula | Shade |
|---|---|---|---|
| P-nitraniline | Ar-tetrahydro-β-naphthylamine. | 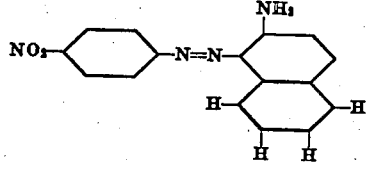 | Golden orange. |
| m-nitraniline | Ar-tetrahydro-α-naphthylamine. | 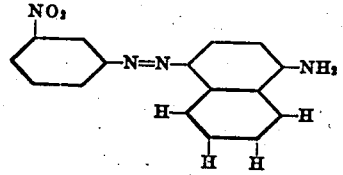 | Marigold. |
| p-nitraniline | Ar-tetrahydro-α-naphthylamine. | 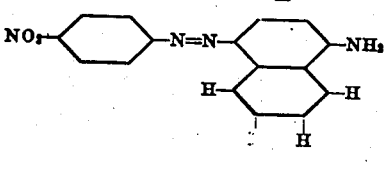 | Orange. |
| p-nitraniline-o-sulphonic acid. | Ar-tetrahydro-α-naphthylamine. | 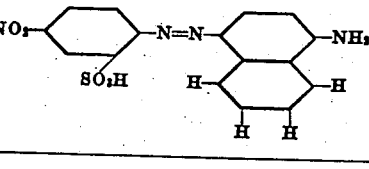 | Orange red. |

In the case of the last four dyestuffs, similar shades may be obtained by using alkyl derivatives of the ar-tetrahydro-naphthylamines.

The dyestuffs or components may be applied to the materials in the form of aqueous solutions or aqueous solutions of their salts, if sufficiently soluble, and in so applying them any of the usual assistants may be employed. If insufficiently soluble the dyestuffs or components may be applied in the form of aqueous suspensions or dispersions produced by any suitable methods. Dispersions of the dyestuffs or components may, for example, be obtained by grinding in the so-called colloid mills, by dissolving in a solvent and mixing with water containing or not containing dispersators or protective colloids or by treatment with dispersators, for example in the manner described in U. S. Patents Nos. 1,618,413, 1,614,414, 1,694,413, 1,690,481 and 1,716,721, and U. S. Patent applications S. Nos. 152,517 dated 3rd December 1926, 134,138 dated 7th September 1926, 390,423 dated 4th September 1929 and 390,424 dated 4th September 1929. The compositions of matter containing the relatively insoluble dyestuffs or the tetrahydro-naphthylamines or relatively water insoluble derivatives thereof and containing dispersators and/or protective colloids are included in the present invention.

As indicated above dyestuffs containing diazotizable amino groups may be diazotized on the fibre and developed. Alternatively dyestuffs containing groups capable of effecting a coupling may be developed on the fibre with the aid of solutions of diazo bodies.

The following examples show the best methods known to me for carrying the invention into effect; but of course they are not to be considered as limiting the invention in any way:—

*Example 1*

210 grams of p-nitraniline are dissolved in water with addition of 420 ccs. of hydrochloric acid of 22° Bé., and the solution cooled with ice to 5–10° C. The volume is now approximately 3 litres. A solution of 115 grams of technical sodium nitrite (95%) in 1 litre of water is now added in one lot and the mixture well stirred till a clear solution is obtained. 224 grams of ar-tetrahydro-α-naphthylamine are dissolved in water with the addition of sufficient hydrochloric acid to effect solution and cooled to 5–10° C. by adding chopped ice. The diazo solution is now run in slowly, mineral acidity being neutralized by addition of sodium acetate solution (test with Congo red paper). When coupling is complete the insoluble dyestuff is filtered off, and washed well with water. It is preferably retained as an aqueous paste.

*Example 2*

147 grams ar-tetrahydro-β-naphthylamine are dissolved by warming with 500 ccs. hot water and 300 ccs. of concentrated hydrochloric acid, and ice added to bring the temperature to 0° C. 70 grams of sodium nitrite (100%) dissolved in 500 ccs. of water are now added quickly with stirring, and stirred for a few minutes, when the solution should show a very slight excess of nitrous acid (starch iodide paper). It is now added slowly to a cooled aqueous solution of 116 grams sodium phenate, dilute sodium carbonate solution being run in at the same time at such a rate that slight alkalinity is maintained throughout the coupling operation. The precipitated dyestuff is filtered off, and washed well with cold water. It is preferably retained as an aqueous paste.

*Example 3*

To dye an orange shade on 10 kilos of cellulose acetate knit fabric:—

100 grams of ar-tetrahydro-β-naphthylamine are dispersed by warming with 500 grams of Turkey red oil (50%) and diluted with soft water. 200 grams of naphthol AS.BS are dissolved by heating in water containing 100 grams of caustic soda and 300 grams Turkey red oil. The solutions are mixed, diluted to 300 litres with soft water, and sufficient of a 10% solution of acetic acid added to neutralize most of the alkali, but still maintain a slight alkaline reaction. The bath is heated to 75–80° C. and 10 kilograms of cellulose acetate knit fabric entered, and treated for 2 hours at 80–85° C. The goods are now rinsed well and immersed in a cold bath containing 4 grams per litre of sodium nitrite and 8 ccs. per litre of glacial acetic acid. They are worked for ¾ hour in this bath, during which time the colour develops slowly. Coupling may be completed advantageously by transferring to a cold bath containing 1 gram per litre of sodium carbonate, and working till the desired shade is obtained. The goods, which are now dyed an orange shade, are rinsed, soaped lightly, and dried or otherwise treated as requisite.

*Example 4*

To dye an orange shade on 10 kilos of cellulose acetate yarn in hank form:—

200 grams of the dyestuff obtained by coupling diazotized p-nitraniline-o-sulphonic acid with ar-tetrahydro-α-naphthylamine are dissolved as the sodium salt in 300 litres of water at 50–60° C. the goods entered and the temperature raised slowly to 80° C. Glauber's salt up to 40% and acetic acid up to 2–3%, both on the weight of goods, may be added as necessary to exhaust. When the desired shade is achieved the goods are lifted, rinsed and dried or otherwise treated as requisite.

*Example 5*

To dye a marigold shade on 10 kilos of cellulose acetate knit fabric.

100 grams of finely ground dyestuff obtained by coupling diazotized m-nitraniline with ar-tetrahydro-α-naphthylamine are well stirred with 1 kilo of Turkey red oil (50%); the mixture is heated with stirring until a good dispersion is obtained, then diluted with boiling soft water and passed through a filter cloth into a dyebath containing 300 litres of soft water. The material is entered, and dyeing carried out as usual, the temperature being raised slowly to 80° C., and the fabric processed at this temperature till the desired shade is achieved. The goods are now lifted, rinsed and dried or otherwise treated as requisite.

What I claim and desire to secure by Letters Patent is:—

1. Process for coloring materials containing an organic derivative of cellulose which comprises applying thereto unsulphonated azo dyestuffs containing the tetrahydronaphthalene nucelus.

2. Process for coloring materials containing an organic derivative of cellulose which comprises forming unsulphonated azo dyes thereon by coupling on the materials a compound of the ar-tetrahydro-naphthylamine series with a further component.

3. Process for coloring materials containing an organic derivative of cellulose which comprises applying thereto unsulphonated azo dyestuffs obtainable by coupling a compound of the ar-tetrahydro-α-naphthylamine series with a further component.

4. Process for coloring materials containing cellulose acetate which comprises applying thereto unsulphonated azo dyestuffs containing the tetrahydronaphthalene nucleus.

5. Process for coloring materials containing cellulose acetate which comprises forming on the materials unsulphonated azo dyestuffs containing the tetrahydronaphthalene nucleus.

6. Process for coloring materials containing cellulose acetate which comprises applying thereto aqueous dispersions containing relatively insoluble unsulphonated azo dyestuffs containing the tetrahydronaphthalene nucleus.

7. Materials comprising organic substitution derivatives of cellulose colored with unsulphonated azo dyestuffs containing the tetrahydronaphthalene nucleus.

8. Materials comprising cellulose acetate colored with unsulphonated azo dyestuffs containing the tetrahydronaphthalene nucleus.

HENRY CHARLES OLPIN.